(12) United States Patent
Jeanneteau et al.

(10) Patent No.: US 8,884,196 B2
(45) Date of Patent: Nov. 11, 2014

(54) COOKING DEVICE FOR A COOKING CONTAINER

(75) Inventors: Laurent Jeanneteau, Compiegne (FR); Thibaut Rigolle, Forli (IT); Erik Svend Christiansen, Faenza (IT); Massimo Zangoli, Santarcangelo di Romagna (IT)

(73) Assignee: Electrolux Home Products Corporation N.V., Zaventem (BE)

( * ) Notice: Subject to any disclaimer, the term of this patent is extended or adjusted under 35 U.S.C. 154(b) by 1010 days.

(21) Appl. No.: 12/993,937

(22) PCT Filed: May 20, 2009

(86) PCT No.: PCT/EP2009/003595
§ 371 (c)(1),
(2), (4) Date: Apr. 6, 2011

(87) PCT Pub. No.: WO2009/146796
PCT Pub. Date: Dec. 10, 2009

(65) Prior Publication Data
US 2011/0180530 A1    Jul. 28, 2011

(30) Foreign Application Priority Data
Jun. 5, 2011 (EP) .................................. 08010236

(51) Int. Cl.
*H05B 6/12* (2006.01)
*H05B 6/06* (2006.01)
*F24C 15/10* (2006.01)
*A47J 27/022* (2006.01)

(52) U.S. Cl.
CPC .............. *H05B 6/062* (2013.01); *F24C 15/102* (2013.01); *H05B 6/1227* (2013.01); *H05B 2213/04* (2013.01); *A47J 27/022* (2013.01)
USPC ........................................................ 219/621

(58) Field of Classification Search
CPC .......... H05B 6/12; A47J 36/02; A47J 27/002; A47J 36/2494; A05B 6/062
USPC .................. 219/672, 676, 661–667, 626, 627
See application file for complete search history.

(56) References Cited

U.S. PATENT DOCUMENTS 3,742,179 A * 6/1973 Harnden, Jr. .................. 219/627
5,386,102 A * 1/1995 Takikawa et al. ............. 219/620
(Continued)

FOREIGN PATENT DOCUMENTS

DE    102006021029    * 10/2007
EP    0458977    12/1991
(Continued)

OTHER PUBLICATIONS

International Search Report for PCT/EP2009/003595, dated Jul. 6, 2009, 2.

*Primary Examiner* — Dana Ross
*Assistant Examiner* — Frederick Calvetti
(74) *Attorney, Agent, or Firm* — Pearne & Gordon LLP

(57) ABSTRACT

The invention relates to a cooking device (1, 12) for a cooking container (10, 11), a) wherein the cooking device (1, 12) comprises at its lower surface (20) a curved, especially concave, cooking surface (2) adapted to the form of the cooking container (10, 11), b) wherein the cooking surface (2) comprises a first (2a) and a second (2b) partial surface, c) wherein the cooking container (10, 11) comprises a first area (20a) adjacent to the first partial surface (2a) and a second area (20b) adjacent to the second partial surface (2b), d) wherein the first area (20a) is heated by a first induction element (3) and the second area (20b) is heated by a second induction element (4), e) wherein each induction element (3, 4) comprises an individual heat sensor (3d, 4d) and f) wherein at least the second induction element (4) can be controlled independently from the first induction element (3).

14 Claims, 2 Drawing Sheets

(56) References Cited

U.S. PATENT DOCUMENTS

| | | | |
|---|---|---|---|
| 5,512,733 A * | 4/1996 | Takikawa et al. | 219/620 |
| 5,687,642 A * | 11/1997 | Chao | 99/451 |
| 6,894,255 B2 * | 5/2005 | Fujii et al. | 219/621 |
| 7,102,109 B2 * | 9/2006 | Niiyama et al. | 219/627 |
| 2007/0263699 A1 * | 11/2007 | Clothier et al. | 374/163 |

FOREIGN PATENT DOCUMENTS

| | | |
|---|---|---|
| EP | 0629820 | 12/1994 |
| EP | 0623988 | 1/1995 |

* cited by examiner

COOKING DEVICE FOR A COOKING CONTAINER

The invention relates to a cooking device for a cooking container.

In a relatively large number of cooking containers, like woks or rice cookers, the heat is generated at different heights, because these cooking containers have a curved lower surface. When cooking in these containers, often times the amount of liquid inside varies or decreases during cooking, as either liquid is added or liquid is steamed.

On the other hand, areas filled with liquids have a larger heat capacity than areas which contain no liquids. This, however, means that there is a danger of overheating the containers in the areas without liquids. However, if the heating area is reduced too much, not enough heat will reach the container so that a fast cooking with high power as expected for cooking containers like wok pans or rice cookers is not possible.

Therefore, it is an object of the invention to propose a new cooking system, which particularly overcomes these disadvantages of known systems.

This object is solved by a cooking device according to claim 1. Advantageous embodiments are described in the dependent claims.

According to claim 1, the invention relates to a cooking device for a cooking container,
  a) wherein the cooking device comprises a curved, especially concave, cooking surface adapted to the form of the cooking container,
  b) wherein the cooking surface comprises a first and a second partial surface,
  c) wherein the cooking container comprises at its lower surface a first area adjacent to a first partial surface and a second area adjacent to a second partial surface,
  d) wherein the first partial area is heated by a first induction element and the second partial area is heated by a second induction element,
  e) wherein each induction element comprises an individual heat sensor and
  f) wherein at least the second induction element can be controlled and/or regulated independently from the first induction element.

This means that cooking in different areas of the cooking container is possible in a flexible way as different induction elements are present. For example, if the liquid level decreases too much in one of the areas of the cooking container powered by the inductions elements, the corresponding induction element can be turned off. This enables a better protection of the cooking container as the risk of overheating and/or damaging the cooking container can be reduced.

On the other hand, if a lot of liquid is used or for starting the heating process, both induction elements can be operated concurrently.

The heat sensors preferably measure the temperature of the adjacent partial surface.

Preferably,
  a) the first partial surface is an inner and/or lower surface with respect to the second partial surface, wherein especially the second partial surface surrounds the first partial surface, particularly immediately and/or ring-shaped, and/or
  b) the first area is an inner and/or lower area with respect to the second area, wherein especially the second area surrounds the first area, particularly immediately and/or ring-shaped.

A direct adjacency of the first and the second partial surface and/or of the first and the second area improves the controllability of the cooking process.

Preferably, the cooking container has a curved, especially convex, bottom surface. In an advantageous embodiment, the cooking container is a pot, a wok pan and/or a rice cooker.

A wok, for example, traditionally has a curved bottom surface which means the area filled with liquids can considerably be reduced if the amount of liquid is decreased. Therefore, the invention is well suited for using cooking containers like woks.

Preferably, the power distribution between the induction elements and/or the overall power is selectable. By this, it can be determined, for example, with which temperature and/or heating energy the area filled with liquid should be heated and with which temperature and/or heating energy the area without liquid should be heated.

In an advantageous embodiment, the heat sensors detect the temperature in different heights, especially in the height where liquid is present and in the height where liquid is not present.

Preferably, a control unit determines the level of liquid in the cooking container. This can be achieved, for example, by analysing the temperatures measured by the heat sensors.

In an advantageous embodiment, an induction element is, especially automatically, turned off when the temperature is too high, especially after detection by a heat sensor and/or when a lack of liquid is detected.

Preferably, each induction element comprises at least one induction coil and/or each induction coil and/or induction element is powered by a separate generator. This enables an independent operation and powerful of the induction coils and/or induction elements.

In an advantageous embodiment, the temperature and/or the maximum power can be regulated separately for each coil. This increases the flexibility during the cooking process as the user can determine, for example, with which temperature or power the areas with liquid, on the one hand, and without liquid, on the other hand, will be heated.

Preferably,
  a) the cooking surface comprises n partial surfaces,
  b) wherein n>1,
  c) wherein the cooking container comprises n areas adjacent to n partial surfaces,
  d) wherein the n areas are heated by n induction elements,
  e) wherein each induction element comprises an individual heat sensor and
  f) wherein at least n−1 induction elements can be controlled independently from the first induction element.

An larger number of induction elements enables a better adaption to the level of liquid, as, for examples, the upper and/or lower induction elements can subsequently be turned off or lower during the decreasing of the liquid level.

The invention will be described in further details with references to the figures, in which FIG. 1 shows a of cross sectional view of a cooking device according to an embodiment of the invention, FIG. 2 shows a top view of the cooking device according to FIG. 1.

FIG. 3 shows a cross sectional view of a cooking device according to another embodiment of the invention and in which

Figure 1:
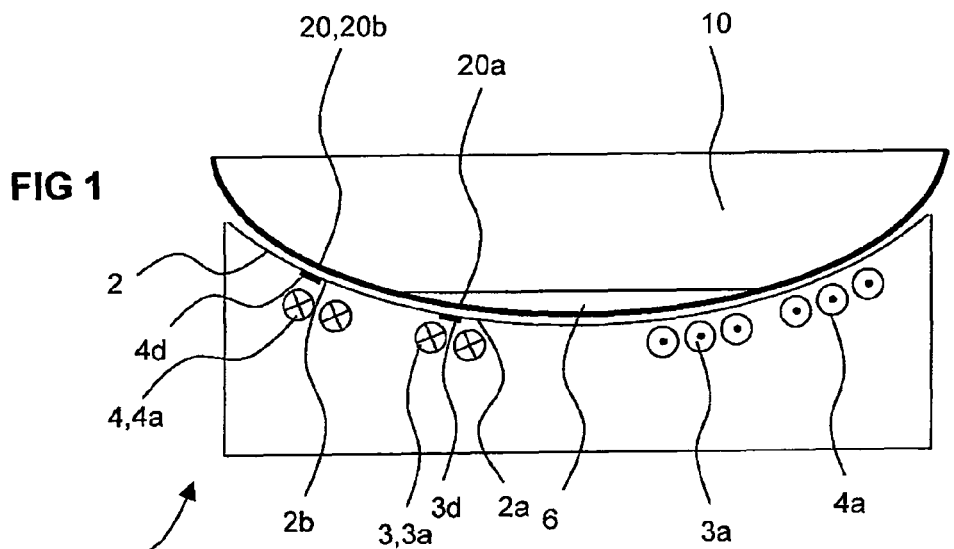
FIG. 1 shows a cross sectional view of a cooking device 1 according to the invention with a wok pan 10 on it.

The cooking surface 2 on the top of the cooking device 1 is concavely curved and by this adapted to the convexly curved lower surface 20 of the wok pan 10 arranged on the cooking surface 2. The cooking surface 2 is divided in a circular inner partial surface 2a and a ring-shaped outer partial surface 2b immediately surrounding the inner surface 2a, wherein the inner partial surface 2a is powered by the induction coils 3a as part of the induction element 3 and the outer partial surface 2b is powered by the induction coils 4a as part of the induction element 4.

Figure 3:
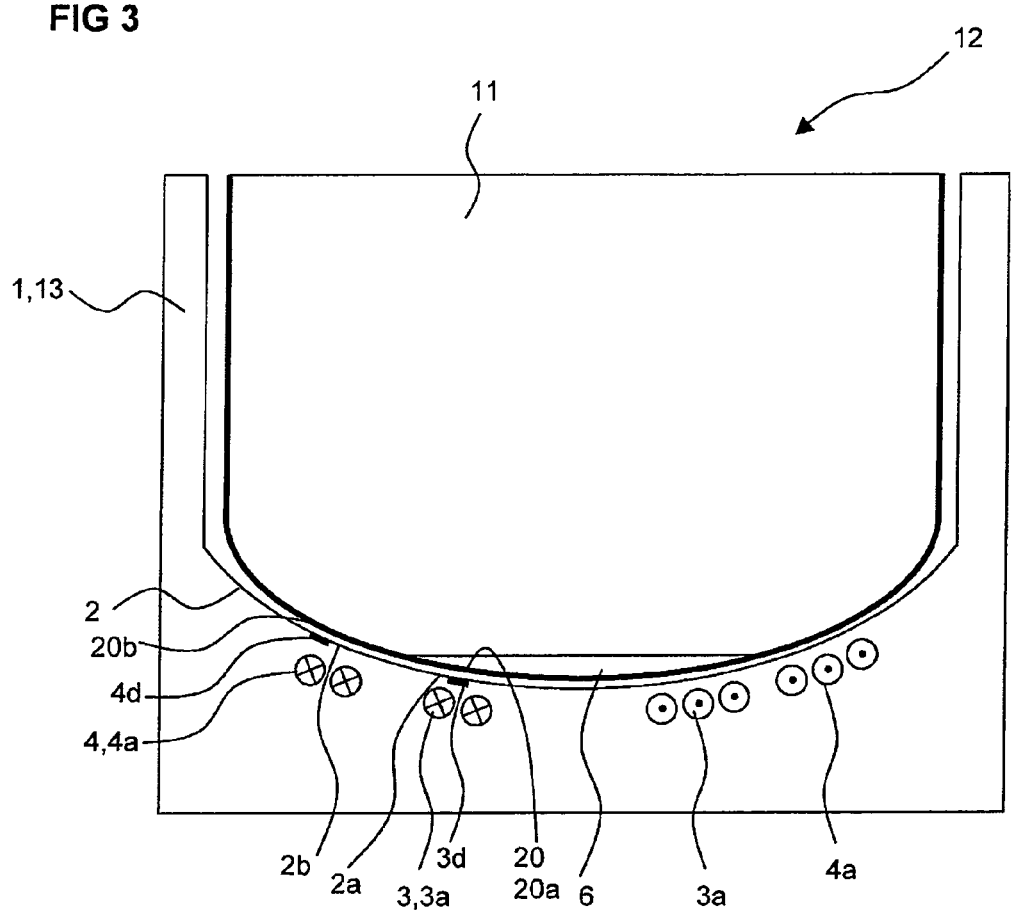

FIG. 3 shows a cross sectional view of another cooking device 12 according to the invention, which can be used as a rice cooker and has a rice pot 11 on it.

The cooking surface 2 on the top of the cooking device 12 is concavely curved and by this adapted to the convexly curved lower surface 20 of the rice cooker 12 arranged on the cooking surface 2. The cooking surface 2 is divided in a circular inner surface 2a and a ring-shaped outer surface 2b surrounding the inner surface 2a, wherein the inner surface 2a is powered by the induction coils 3a as part of the induction element 3 and the outer surface 2b is powered by the induction coils 4a as part of the induction element 4.

The rice cooker 12 according to FIG. 3 has a cylindrical wall 13 protruding from the cooking surface 2 to the top of the rice pot 11. The cylindrical wall 13 surrounds the rice pot 11.

In both embodiments, the induction coils 4a are designed as circular turns and surround the induction coils 3a which are also designed as circular turns. In the figures, a small number of turn is shown for making the turn clearly visible in the figures. However, also a larger number of turns is possible.

The induction element 3 furthermore comprises a heat sensor 3d, whereas the induction element 4 comprises a heat sensor 4d, which are arranged between the coils and the corresponding cooking surfaces.

FIG. 1 and FIG. 3 furthermore show a liquid level 6. In this example, the induction coils 4a will be turned off after some time to prevent overheating and/or damaging of the outer surface 2b.

Figure 2:
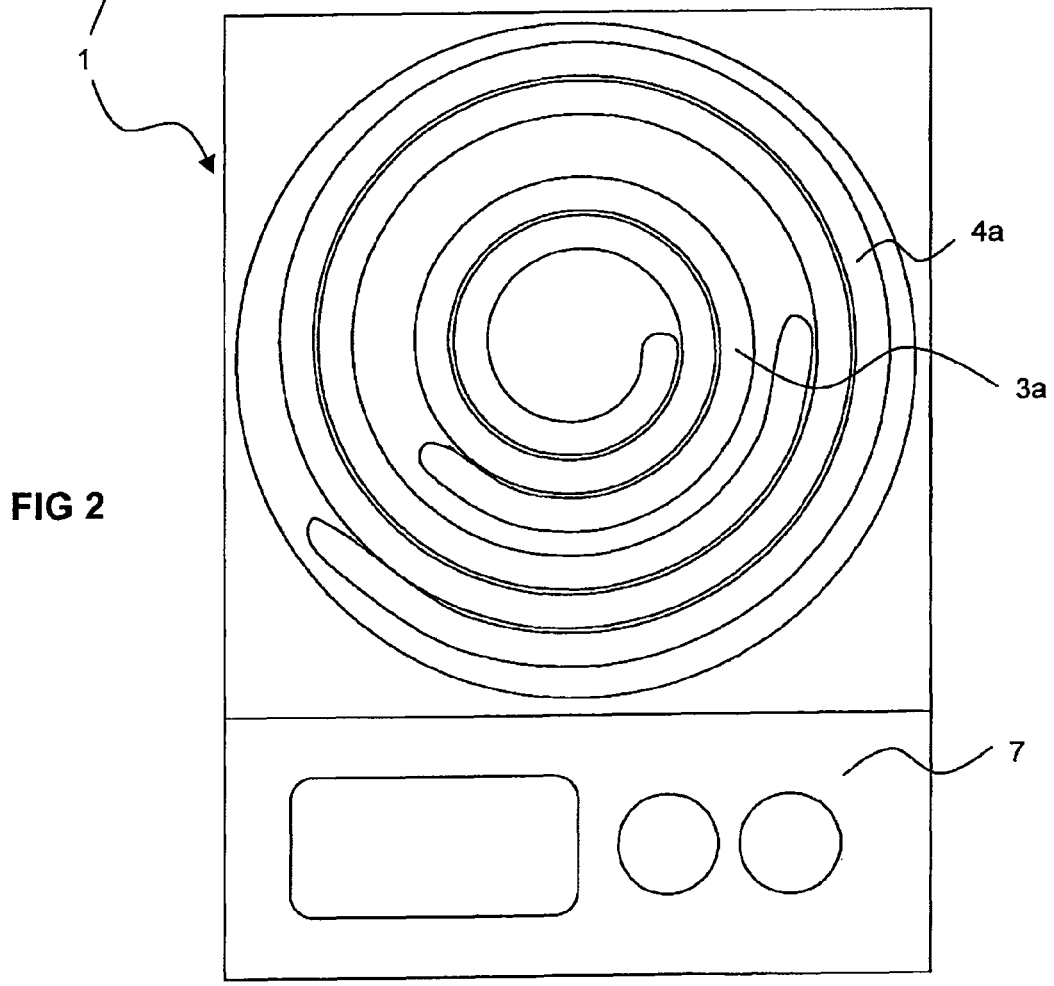

FIG. 2 shows a top view of the cooking device 1 according to FIG. 1 after removing the cooking surface 2. The induction coils 4a surround the induction coils 3a. As can be seen from FIG. 2, the induction coil 3a proceeds in concentric circles and also the outer induction coil 4a proceeds in concentric circles, wherein the circles of the induction coil 4a proceed around the induction coil 3a. The circles formed by the induction coil 3a as well as the circles formed by the induction coil 4a have the same center.

The cooking device can be operated by a control panel 7. The induction elements 3 and 4 can be controlled separately by the user from the control panel 7 by using different control buttons.

Figure 4:
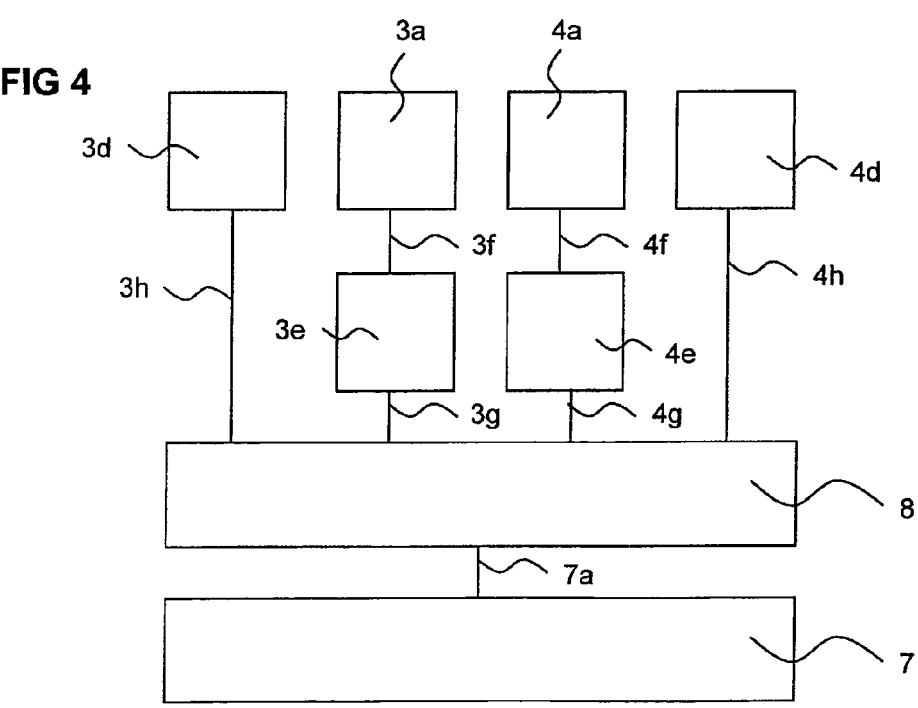
FIG. 4 shows a block diagram of the system.

The induction coil 3a is powered by an induction generator 3e via control and power lines 3f, as can be seen from the block diagram in FIG. 4, whereas the induction coil 4a is powered by an induction generator 4e via control and power lines 4f.

The induction generator 3e is controlled by the control unit 8 via the control line 3g, the induction generator 4e is controlled by the control unit 8 via the control line 4g. The signal 3h generated by the sensor 3d as well as the signal 4h generated by the sensor 4d is passed to the control unit 8. Finally, the user inputs from the control panel 7 are passed to the control unit 8 by the control line 7a.

The induction coil 3a heats up the area 20a, which in turn heats up the inner partial surface 2a. The induction coil 4a heats up the area 20b, which in turn heats up the outer partial surface 2b.

The switching off one induction element can be performed automatically. A control unit 8 analyzes the output of the heat sensor 3d indicating the temperature of the partial surface 2a and turns off the induction coil 3a, if the heat sensor shows an overheating of the inner partial surface 2a. Similarly, the control unit 8 analyzes the output of the heat sensor 4d indicating the temperature of the partial surface 2b and turns off the induction coil 4a, if the heat sensor shows an overheating of the outer partial surface 2b. From the measured temperatures, the control unit 8 can detect the level of liquid 6 inside the cooking container.

It is also possible to heat different portions of the cooking containers 1, 12. For example, small portions, also called Asian style portions, can be cooked using only the lower, inner induction element 3, whereas big portions, also called Western style portions, can be cooked using the lower, inner induction element 3 in addition to the outer, upper induction element 4.

Instead of two induction elements, also 3 or more induction elements can be used.

LIST OF REFERENCE SIGNS 1, 12 cooking device
2 cooking surface
2a inner partial surface
2b outer partial surface
3, 4 induction elements
3a, 4a induction coils
3d, 4d heat sensors
3e, 4e induction generators
3f, 3g
3h, 4f
4g, 4h,
7a control and power lines
6 liquid level
7 control panel
8 control unit
10 wok pan
11 rice cooker
13 wall
20 lower surface
20a first area
20b second area

The invention claimed is:

1. Cooking device (1, 12) for a cooking container (10, 11), a) wherein the cooking device (1, 12) comprises a curved cooking surface (2) adapted to the bottom shape of the cooking container (10, 11), b) wherein the cooking surface (2) comprises a first partial surface (2a) and a second partial surface (2b), c) wherein the bottom surface (20) of the cooking container (10, 11) comprises a first bottom area (20a) adjacent to the first partial surface (2a) and a second bottom area (20b) adjacent to the second partial surface (2b), d) wherein the first bottom area (20a) is heated by a first induction element (3) and the second bottom area (20b) is heated by a second induction element (4), e) wherein each induction element (3, 4) comprises an individual heat sensor (3d, 4d) and f) wherein at least the second induction element (4) can be controlled and/or regulated independently from the first induction element (3).

2. Cooking device according to claim 1, a) wherein the first partial surface (2a) is a circular inner and/or lower surface with respect to the second partial surface (2b), wherein the second partial surface (2b) surrounds the first partial surface (2a), and/or b) wherein the first bottom area (20a) is a circular inner and/or lower area with respect to the second bottom area (20b), wherein the second bottom area (20b) surrounds the first bottom area (20).

3. Cooking device according to claim 1, wherein the cooking container (10, 11) has a convexly curved lower surface (20).

4. Cooking device according to claim 1, wherein the cooking container (10, 11) is a pot, a wok pan (10) and/or a rice cooker (11).

5. Cooking device according to claim 1, wherein the power distribution between the induction elements and/or the overall power is selectable.

6. Cooking device according to claim 1, wherein the heat sensors (3d, 4d) detect the temperature in different heights.

7. Cooking device according to claim 1, wherein a control unit (8) determines the level of liquid in the cooking container (10, 11).

8. Cooking device according to claim 6, wherein the induction element (3, 4) is automatically turned off when the temperature detected by the heat sensor (3d, 4d) is too high and/or when a lack of liquid (6) is detected.

9. Cooking device according to claim 1, a) wherein each induction element (3, 4) comprises at least one induction coil (3a, 4a) and/or is powered by a separate generator (3e, 4e) and/or b) wherein the temperature and/or the maximum power can be regulated separately for each induction element (3, 4) and/or induction coil (3a, 4a).

10. Cooking device according to claim 1, a) wherein the cooking surface (2) comprises n partial surfaces (2a, 2b, . . . ), b) wherein n>1, c) wherein the cooking container (10, 11) comprises n bottom areas (20a, 20b, . . . ) adjacent to n partial surfaces (2a, 2b, . . . ), d) wherein the n areas (20a, 20b, . . . ) are heated by n induction elements (3a, 4a, . . . ), e) wherein each induction element (3, 4, . . . ) comprises an individual heat sensor (3d, 4d) and f) wherein at least n−1 induction elements (4, . . . ) can be controlled independently from the first induction element (3).

11. Cooking device according to claim 1, wherein each individual heat sensor (3d, 4d) is arranged between each induction element (3, 4) and the bottom surface (20) of the cooking container (10, 11).

12. Cooking device according to claim 1, wherein the cooking surface (2) is concave.

13. Cooking device according to claim 1, wherein the entire cooking surface (2) is concave and faces upwardly.

14. Cooking device according to claim 1, wherein the cooking device (1, 12) comprises a side wall and the cooking surface is a concavely curved cooking surface (2) closing a bottom of the cooking device.

\* \* \* \* \*